March 29, 1960    C. F. SPADEMAN ET AL    2,930,227
LOAD MEASURING DEVICE
Filed July 9, 1956    2 Sheets-Sheet 1
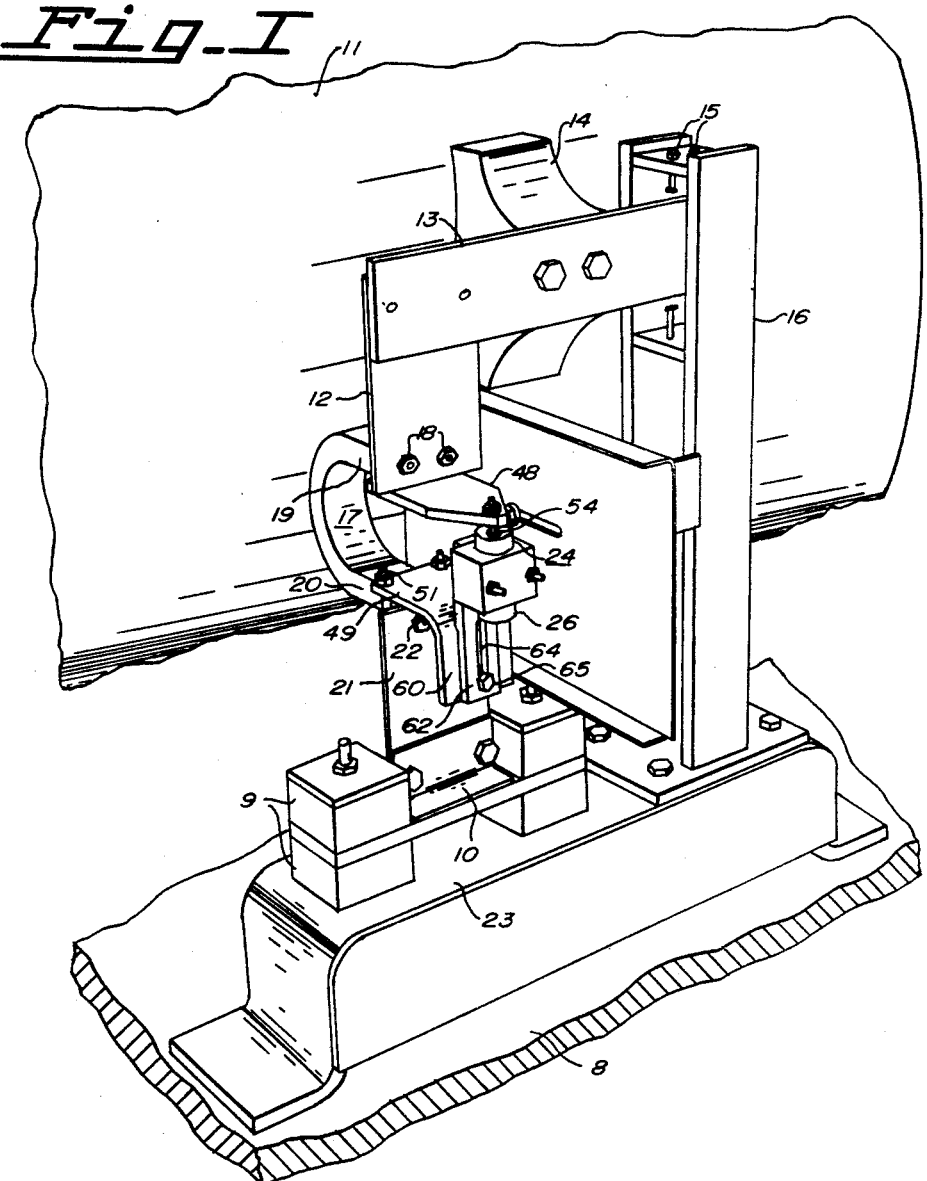
INVENTORS
CHARLES F. SPADEMAN
KENNETH F. WETZEL
BY
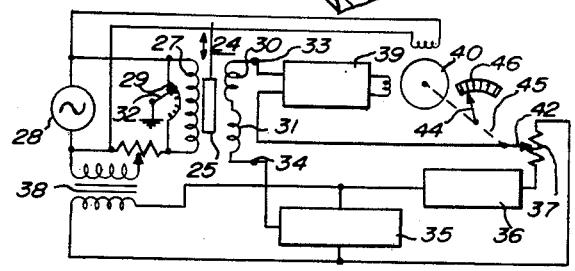
ATTORNEYS

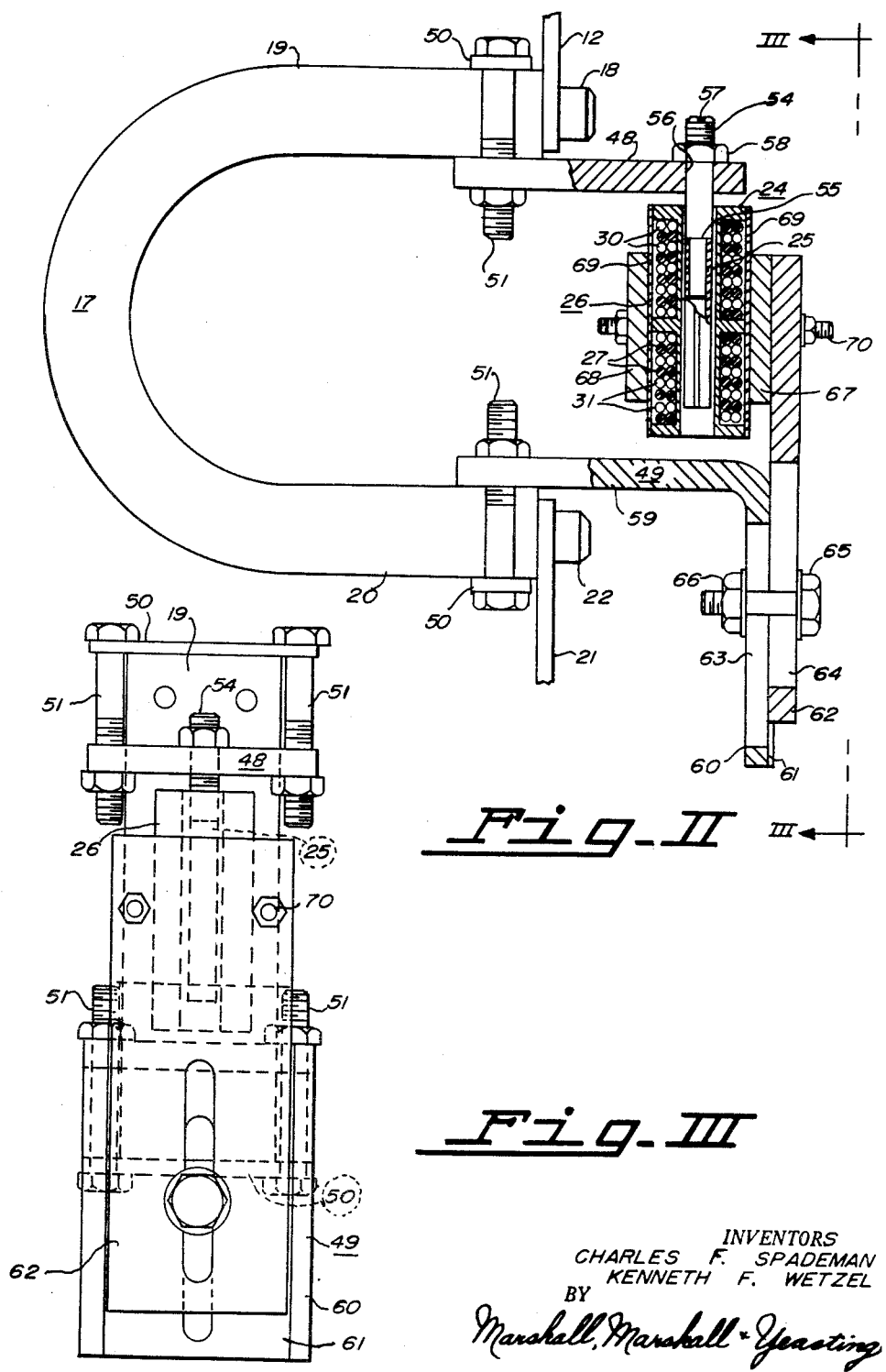

United States Patent Office 2,930,227
Patented Mar. 29, 1960

2,930,227

LOAD MEASURING DEVICE

Charles F. Spademan and Kenneth F. Wetzel, Toledo, Ohio, assignors, by mesne assignments, to Toledo Scale Corporation, Toledo, Ohio, a corporation of Ohio Application July 9, 1956, Serial No. 596,634

6 Claims. (Cl. 73—141)

This invention relates to a load measuring mechanism and more particularly to a displacement measuring means associated with a load measuring mechanism.

Heretofore it has been known to measure a load by applying that load to a suitable receiver, opposing the displacement of the receiver by means which yields an amount proportional to the force imposed by the load, and measuring the relative displacement of a pair of reference points in the moving system as an indication of the magnitude of the load. Such displacement measuring means can be mechanical in nature or advantageously, especially where the magnitude of the displacement is small, electro mechanical. The precision necessary in present day load measuring systems places stability requirements upon the mechanical system utilized in sensing displacement which have been considered to demand constructions offering little or no adjustment. Accordingly, in the past, such devices have required meticulous construction and adjustment in the factory and have been arranged to sense over a fixed range such that the zero load and span adjustments were permanently fixed at the time of construction. Further, in the past no means has been provided for compensating for expansion and contraction of the system as a result of temperature variations.

The objects of this invention are to improve load measuring devices, to increase the precision of such devices, to facilitate the mechanical adjustment of such devices, to simplify the construction of such devices, and to compensate such devices for changes in temperature.

One embodiment of this invention enabling the realization of these objects is a combination of a spring structure to which is applied a portion of the force of a load to be measured and an electrical translator such as a differential transformer having a first component which in a transformer comprises its core structure supported at one reference point on the spring and a second component movable with respect to the first component along an axis which in a transformer can comprise its conductive windings supported at another reference point on the spring which is displaced with respect to the first point as a function of the applied force. When a load distorts the spring structure it shifts the core of the transformer with respect to its windings and changes the inductive coupling therein whereby the electrical output of the transformer changes to supply a signal to a circuit including an indicator which sets forth the load. Transformers of this form are available which offer a linear response with respect to relative movement between the core and windings. The spring structure is U-shaped and the load is applied to the legs of the U to change their separation. The transformer core is supported from one leg of the U and the windings from the other leg by means of brackets offering universal adjustment of the relative positions of core and windings and introducing an adjustable amount of compensation for expansion and contraction with temperature along the displacement axis of the spring.

Each bracket has a portion parallel to the legs of the U which is secured to a leg by clamps which afford adjustment of the length of the radius from the bending center of the spring legs to the transformer elements thus providing an adjustable multiplying factor between relative displacement of the spring reference points and the transformer elements. One bracket is also provided with a slotted portion bent at a right angle to the spring leg upon which it is supported in a direction extending away from the opposite spring leg. A separate slotted portion of the bent bracket is secured to the bent portion by means of a bolt extending through the slots and extends from the bolt back upon the bent portion and toward the opposite spring leg. By suitable choice of the materials in the bent bracket portion and the portion secured thereto the linear expansion and contraction with temperature along the axis of displacement of the spring and transformer structure is compensated in the brackets. Thus in the example the L-shaped bracket is of a material having a relatively high thermal coefficient of expansion while the second bracket portion is of a material having a low coefficient. As the temperature is increased the tendency of the core to advance into the windings is overcome by the expansion of that portion of the bracket at right angles to the spring leg extending from the bend to the bolt. It will thus be seen that the position of the bolt can be adjusted along the slots in the bracket pieces to adjust the effective length of the temperature compensator without shifting the position of the transformer element supported thereby, and conversely the position of that element with respect to the other transformer element can be shifted without changing significantly the length of the compensator by sliding the second bracket portion with respect to the first without shifting the position of the bolt.

In accordance with the above, one feature of this invention resides in supporting a displacement sensing element in a system, wherein the relative displacement of a reference point with respect to another point is a function of applied load, by means of a bimetallic structure which introduces a net thermal expansion characteristic along the axis of sensed displacement in opposition to the thermal expansion characteristic of the remainder of the system along that axis.

Another feature resides in providing universal adjustment of the relative positions of the displacement sensing elements and adjustment of the degree of displacement between said elements by a given force by providing a support which permits the adjustment of the effective length of the radii around which displacement occurs, and which permits the adjustment of the position of the displacement sensing elements in directions normal to said radii.

A further feature involves coupling the support elements of different thermal coefficients of expansion as employed to sustain a displacement sensing means in a load measuring mechanism whereby the relative lengths of said elements either jointly or severally can be adjusted to alter the thermal expansive characteristics without altering the relative position of the displacement sensing means. Conversely, the relative position of the separate portions of the displacement sensing means can be altered without altering the relative lengths of the support elements. This is accomplished by means of readily clamped sliding and threaded connections between the several support elements and the sensing means.

The above and other objects and features of this invention will be appreciated more fully from the following detailed description when read with reference to the accompanying drawings wherein:

Fig. I is a perspective view of one form of load sensing mechanism according to this invention with the dust cover removed, showing its utilization with a dynamometer;

Fig. II is a partially sectioned elevation of the load sensing mechanism of Fig. I;

Fig. III is an end elevation of Fig. II taken along the line III—III with the flexure plates, by means of which the load is applied, removed; and Fig. IV is a block diagram of the indicating circuit coupled to the displacement sensing element of the preceding figures.

Referring to the drawings, in Fig. I a load sensing mechanism as contemplated in this invention is shown in combination with an electric dynamometer wherein torque applied to the dynamometer shaft (not shown) tends to cause the rotation of stator 11 applying a force to flexure plate 12 by means of link 13 secured to the stator housing by means of bracket 14. The movement of link 13 is restricted by limits 15 such as the heads of bolts tapped into standard 16 whereby that movement, although a portion of an arc with a radius from the centerline of the dynamometer, is essentially linear and normal to its major face. This movement is transmitted to the U-shaped spring 17 through the flexure plate 12 coupled thereto as by means of machine screws 18 tapped into the end of the upper leg 19 of the spring to alter the separation of that leg from the lower leg 20 which is fixed in position by means of flexure plate 21, advantageously mounted in the plane of flexure plate 12. Plate 21 is secured to leg 20 by tapped machine screws 22 and similarly to a bracket 10 on the base 23. A flexible and vibration damping coupling in the form of resilient blocks 9 embrace the base of the bracket 10 to dampen vibrations from the dynamometer base 8 and to permit a limited rocking of the flexure plate 21 as the spring 17 is distorted.

The change in separation of the legs 19 and 20 is sensed in the differential transformer 24 having its core 25 supported by leg 19 and its winding assembly 26 supported by leg 20. The details of the transformer structure and its support which can best be seen in Figs. II and III will be discussed below.

It is to be understood that the use of a differential transformer in the illustrative embodiment is not to be interpreted in a limiting sense since other displacement sensing means are also adaptable to this load measuring system, for example a capacitive element might be employed as in a capacitive bridge circuit or a mechanical linkage could be utilized. The displacement sensing means can be categorized generically as an electric translator having a pair of components which are movable with respect to each other along an axis and a signal output which is a function of the relative position of the components along the axis. When electrical sensing is used, it is convenient to indicate the load by balancing the signal due to the displacement by a second signal which has been calibrated in terms of load. A circuit suitable for such indication is shown in Fig. IV wherein the primary winding 27 of differential transformer 24 is supplied with power, conveniently from a sixty cycle source 28. The secondary of transformer 24 consists of two windings 30 and 31 wound in opposition and positioned symmetrically along the axis of the winding assembly 26 with respect to the primary 27 whereby a minimum signal, ideally zero, is realized when core 25 is centered along the axis of the assembly and provides equal magnetic coupling from the primary to each secondary. This balanced condition is advantageously chosen as the no load indication so that the net signal across terminals 33 and 34 is a minimum due to the equal and opposite effects in secondaries 30 and 31. Several signal sources are included in the indicating circuit including a zero adjustment circuit 35, a span adjustment circuit 36 and a feedback potentiometer 37 all of which are supplied with a sixty cycle signal which is in phase with the signal to the primary as by transformer 38.

The ends of the primary 27 of transformer 24 are balanced to ground by the slide wire potentiometer 29 connected across its terminals and having the brush 32 grounded. This minimizes the capacitance of the primary to ground, improves the linearity of response of the indicating system, reduces variations in the circuit with changes in temperature and stabilizes the response. While an improvement is obtained when the resistances to ground from both sides of the transformer are equal it has been found that an optimum is attained in these desired characteristics by adjusting the potentiometer 29 to provide the highest degree of linearity.

In operation, the signal from terminals 33 and 34, which is of a magnitude which is a function of the displacement of the core 25 within the winding assembly 26 and thus of the applied load, is opposed by a signal from the zero adjustment circuit 35 which balances the differential transformer signal at no load. This zero adjustment can be realized with a potentiometer (not shown) which is suitably adjusted for the operating condition. The differential transformer signal due to a load introduces a signal unbalance in the circuit and supplies a net signal to amplifier 39 which in turn is fed to motor 40 causing it to advance brush 42 on slide wire potentiometer 37 until the signal developed between the brush and the end of the potentiometer is equal and opposite to the load signal. Thus the net signal to the amplifier is reduced to zero and no signal reaches the motor. When the circuit has been balanced with load applied, the amount of displacement of the brush 42 is a function of the load and therefore is employed as a load indication as by coupling an indicator arm 44 to the mechanical linkage 45 between the motor and brush. As the linkage advances the brush to increase the signal feedback from the potentiometer the arm 44 advances across the chart 46 to indicate the load corresponding to that signal.

The span adjustment circuit 36 may comprise a rheostat (not shown). It is adjusted so that the magnitude of the signal developed across the potentiometer 37, the voltage between the effective limits of the potentiometer, corresponds to the signal from the transformer 24 when the load is the maximum of the range to be measured so that the arm 44 moves from a zero designation on the chart 46 at no load to the full chart capacity at the maximum load. Thus, when a load corresponding to the chart capacity is applied, the motor drives the brush 42 to a position which introduces a voltage from the potentiometer equal and opposite to that of the sensing element and drives the arm to a position opposite the full capacity indication on the chart.

The zero adjustment circuit may comprise a potentiometer (not shown) which introduces a signal of an adjustable magnitude and phase to enable the net signal from the amplifier 39 to the motor 40 to be zero when the arm 44 is at zero on the chart 46 and the brush 42 is at the zero end 43 of the potentiometer 37.

Since motor driven, balanced feedback circuits are known for indicators in electrical sensing circuits the details of this circuit have not been shown. When coupled to a sensing element for a dynamometer which is to be subjected selectively to rotating forces in both directions it is convenient to provide switching arrangements (not shown) which reverse the polarity of the signal derived from the secondary of 38 and of the signal from the amplifier to one phase of motor 40, and to employ a switching network (not shown) to selectively connect one of a plurality of potentiometers which has been adjusted for that operating condition in the zero adjustment circuit. Similarly, a switching network (not shown) connecting a rheostat appropriately adjusted for the desired operating condition, may be provided in the span adjustment circuit. Further where several ranges of operation are provided these networks can be expanded to provide individual zero and span adjustments for each operating state.

Returning to a consideration of the mounting for the displacement sensing means, the direct coupling of the sensing means to the reference points of the spring 17 as has been common heretofore requires a complex electrical circuit to enable both coarse and fine adjustment of the zero condition and span of the system. A simple electrical circuit as discussed above employing potentiometers and rheostats as the final zero and span adjusting means can be employed with the present system due to the mechanical adjustment and compensation feature offered by the mounting.

Spring 17 is preferably of a material whose spring characteristics are stable with temperature such that the forces opposing the load force remain essentially constant with temperature. A number of materials having low thermoelastic coefficient are available for such applications. One such material is "Nispan C," an alloy of approximately the following composition by weight: 42% nickel, 5.2% chromium, 2.3% titanium, 0.03% carbon, 0.4% manganese, 0.4% silicon, 0.4% aluminum and the balance iron except for trace impurities. This material is hardened by heat treatment at temperatures in the range of 1100 to 1300° F. to offer, after aging, a thermoelastic coefficient of from $10 \times 10^{-6}$ per degree Fahrenheit to $-10 \times 10^{-6}$ per degree Fahrenheit in the range of $-50$ to $+150°$ F. This material while offering stable elastic characteristics in the range of operating temperatures has a significant linear thermal coefficient of expansion in the same range, about $4.5 \times 10^{-6}$ per degree Fahrenheit. This alloy tends to expand as the temperature is increased in a manner such that the separation of the inner faces of the ends of legs 19 and 20 increases.

The differential transformer is supported from the inner faces of legs 19 and 20 by metallic brackets 48 and 49 respectively which are non-magnetic in order to avoid altering the magnetic flux path coupling the differential transformer windings. These brackets have several functions. Since the legs of the U bend around the bight, the relative movement induced by the application of a load to those legs along the axis of their separation, i.e. in the plane of the paper and parallel to the flexure plates 12 and 21 in Fig. II, causes them to depart from their essentially parallel relationship at no load so that ends of the legs tend to spread under tension and approach under compression to a greater degree than at their bases adjacent the bight of the U. Hence, the displacement of a pair of points in opposite legs of the U on a line paralleling that along which the load is applied is multiplied by a factor which is a function of the distance of the points from the bight of the U. Further, since the U is ferromagnetic, it must be separated a sufficient distance from the transformer to avoid altering the magnetic flux path in the transformer 24. Adjustment of the multiplying factor and magnetic isolation from the spring are provided by the brackets 48 and 49. The effective length of the spring leg is adjustable by virtue of the slidable coupling between each bracket and its spring leg which comprises a clamping plate 50 engaging the face of the leg opposite that contacted by the bracket and held thereagainst as by bolts 51. Adjustment of the eeffctive length of the legs 19 and 20 offers a load measuring, span adjustment inasmuch as it enables the relative displacement of the elements of the displacement sensing means for given loads to be adjusted. Thus it alters the difference between the no load signal and the full load signal to establish the desired capacity of the system.

The mounting also offers two mechanical zero adjustments in that it permits the adjustment of the core 25 along the displacement axis with respect to its supporting bracket 48 and the adjustment along that axis of the winding assembly 26 with respect to its supporting bracket 49. The core structure comprises a ferromagnetic tube 25 which is split axially to reduce eddy current losses and is sprung over a stud 54 of non-magnetic material provided with a shoulder 55 against which the end of the core bears to insure proper axial positioning. The end of the stud is threaded into a tapped hole 56 in bracket 48 and projects therethrough to provide means for turning the stud in the hole, as by screw driver slot 57, to adjust its axial position. A lock nut 58 secures the stud in its adjusted position when turned up against the bracket 48.

Axial adjustment of winding assembly 26 is provided by the two piece construction of its support wherein the first portion 49 is L-shaped so that one leg 59 is parallel to the spring leg 20 to which it is secured and the second leg 60 is at right angles to the first leg and extending away from core supporting bracket 48. A channel 61 is milled in leg 60 to provide a guide in which the second element of the support, a longitudinally slotted, elongated plate 62, is aranged to slide. Leg 60 has a slot 63 paralleling the displacement axis and registering with longitudinal slot 64 in plate 62 so that the leg and plate can be secured together by a bolt 65 and nut 66 to fix their positions along the displacement axis. Since winding assembly 26 is fixedly supported on plate 62 by means of the threaded rods 70 passing through clamping blocks 67 and 68 embracing its cylindrical housing 69, the adjustment of plate 62 adjusts winding assembly 26 with respect to core 25.

Compensation along the displacement axis for thermal expansion and contraction of the spring 17, the core 25, its support stud 54, the thickness of brackets 48 and 49, the winding assembly 26 and its support is provided by the combination of bracket 49 and plate 62. This compensation is realized by an appropriate choice of material and lengths for the bracket and plate whereby the downward expansion along the displacement axis of leg 60 of bracket 49 coupled with the expansion of any other elements of the system tending to withdraw the core 25 from the upper end of the winding assembly just matches the expansion of those elements of the system which tends to displace the core downward or into the winding assembly. Adjustment of the degree of these relative expansions is afforded by slots 63 and 64 and bolt 65 since the effective length of either or both counter expanding elements of the support structure, leg 60 and plate 62, can be altered as desired by shifting the position of the bolt in the slots. Thus as the bolt is lowered the effective length of leg 60 which expands downward is increased and when it is raised the length is decreased. The effective length of plate 62 is similarly altered. Also the relative effective lengths of the leg and plate can be altered by sliding one with respect to the other along the displacement axis or by this movement plus changing the position of the bolt 65.

When temperature compensation is adjusted by movement of the bolt 65 without relative movement of the leg 60 and plate 62, the mechanical zero adjustment is not disturbed. The adjustment afforded by threaded stud 54 in upper bracket 48 enables the zero position of the core and winding assembly to be reestablished if disturbed. Accordingly, this mounting offers adjustable temperature compensation, and independent mechanical zero and span adjustments in a structure offering sufficient stability for the dictates of precision load measuring equipment.

A wide choice of materials is available for the supporting brackets in a structure as described which has been arranged for compensation of thermal expansion provided they are properly correlated as to their thermal coefficients of expansion and, in the case of a sensing element involving magnetic flux coupling, provided they do not disturb the magnetic circuit of the sensing element. One successful embodiment of the present invention has utilized brass having a thermal coefficient of linear expansion of about $20.4 \times 10^{-6}$ per degree centrigrade in the range of $-50$ to $150°$ F. for the brackets 48 and 49 and core supporting stud 54, and Invar an alloy of 36% by weight nickel, less than 1% by weight total of silicon, carbon and manganese, and the balance iron, having a thermal coefficient of linear expansion of about $0.7 \times 10^{-6}$ per degree centrigrade in the range of −50 to 150° F. for plate 62. The relatively low coefficient for the plate enables a short length of leg 60 to compensate the opposite thermal expansion characteristics of the remainder of the system.

Recapitulating, the invention contemplates a load measuring apparatus including a compliant member 17 having a pair of spaced reference points such as the ends of the arms 19 and 20 on spring 17 which are moved with respect to each other as a function of applied load. This movement is sensed as by an electrical translator such as a differential transformer having a pair of components which are movable with respect to each other along an axis such as a core 25 moveable with respect to a winding structure 26 to produce a signal. The core and winding are supported from cantilevers 48 and 59 secured to the spring which enable the distance of the core and winding from the base of the legs of the spring to be adjusted. Linkages are provided between each support or cantilever and its respective element of the transformer which combine to enable their effective lengths and the relative positions of core and winding to be adjusted. Further these linkages may be of materials having different thermal coefficients of linear expansion whereby they can be combined in such lengths that the thermal expansion and contraction of the system is not reflected in a relative displacement of the core and winding. This thermal compensation is realized in the illustrated embodiment by positioning a first linkage section 60 parallel to the axis of movement and extending from one cantilever 59 away from the other cantilever 48 and a second section in the linkage 62 extending from a point on the first section, the bolt 65, parallel to the first section and toward the other cantilever 48. The position of bolt 65 is adjusted to provide the proper proportion between the lengths of linkages 60 and 62 and in many instances enables this proportion to be adjusted without shifting the position of winding 26 with respect to core 25. If such a shift is necessary, the core position is readjusted by means of linkage 54 to cantilever 48.

It is to be understood that the above description is illustrative of this invention and that various modifications thereof can be utilized without departing from its spirit and scope.

Having described the invention, we claim:

1. In a load measuring apparatus, a compliant member, a pair of spaced reference points on said member moveable with respect to each other an amount which is a function of the applied load, an electrical translator, a pair of components in said translator which are moveable with respect to each other along an axis, said translator having a signal output which is a function of the relative position of said components along the axis, supports from each reference point to a respective one of said components transmitting relative movement of said points to said components along their axis of movement and being arranged for temperature compensation of expansion over a range of adjustment, a first portion of one support secured to its respective reference point and extending generally normal to the axis of movement of said components, a second portion of said one support extending from said first portion in a direction generally paralleling the axis of movement of said components, said second portion being of a material having a given temperature coefficient of linear expansion, a third portion of said one support connected to one of said components, and a coupling joining said second portion to said third portion, said coupling being engageable with said second portion over a range of positions thereon along the axis of movement and with said third portion over a range of positions thereon along the axis of movement independent of the position on said second portion whereby the third portion is supported from the second portion and the effective lengths of said second and third portions along the axis of movement are independently variable, said third portion being of a material having a temperature coefficient of linear expansion differing in magnitude from said given coefficient and extending from said coupling to said second portion in a direction paralleling said second portion and extending toward said first portion.

2. In a load measuring apparatus, a compliant member, a pair of spaced reference points on said member moveable with respect to each other an amount which is a function of the applied load, a displacement sensing means, first and second components of said displacement sensing means moveable with respect to each other along an axis to produce a signal from said means which is a function of their relative movement, supports from each reference point of said member to a respective component of said means, a first element of one of said supports having a large thermal coefficient of linear expansion and having an extension between said member and the component it supports along the axis of movement of said components, a connection adjustable along said first element in a plurality of positions generally parallel with said axis and joining said first element with one of said components, a second element of one of said supports having a small thermal coefficient of linear expansion and having an extension between said member and the component it supports which opposes the extension of said first element along the axis of movement of said components, and a connection adjustable along said second element in a plurality of positions generally parallel with said axis and joining said second element with said member and a component.

3. In a load measuring apparatus, a compliant member, a pair of spaced reference points on said member moveable with respect to each other an amount which is a function of the applied load, a displacement sensing means, first and second components of said displacement sensing means moveable with respect to each other along an axis to produce a signal from said means which is a function of their relative movement, supports from each reference point of said member to a respective component of said means, a first element of one of said supports having an adjustable effective length having an extension between said member and the component it supports and having a large thermal coefficient of linear expansion, connections adjustably spaced along the length of said first element joining said first element with said member and one of said components, a second element of one of said supports having an adjustable effective length having an extension between said member and the component it supports and having a large thermal coefficient of linear expansion, and connections adjustably spaced along the length of said second element joining said second element with said member and one of said components, the extension of said first and second elements from their connections with said member to their connection with said component being in opposite directions along the axis of movement.

4. In a load measuring apparatus, a mechanical system moveable by the forces imposed by an applied load, a pair of elements in said system which are moveable with respect to each other in a single plane, a reference point on each of said elements, said reference points being displaced with respect to each other along an axis in said plane an amount which is a function of the applied load, an electrical translator, a pair of relatively moveable components in said translator, said translator having a signal output which is a function of the relative position of said components, cantilevers of adjustable effective length mounted on each element and each mechanically connected to a respective one of said components, one of said cantilevers having a leg extending generally parallel to the axis of displacement in a direction away from said translator, the material of said leg having a given thermal coefficient of linear expansion, a member of a material having a thermal coefficient of linear expansion less than said given coefficient connected to one of said pair of components and extending parallel to said leg, a coupling between said leg and said member permitting adjustment of the position of said member with respect to said leg in a direction paralleling said axis and adjustable in its position along said axis, a second coupling between a second of said cantilevers and the other of said pair of components, and means to adjust the effective length of said second coupling.

5. In a load measuring apparatus, a U-shaped spring, means applying a load across the legs of said U to alter the separation of said legs along a generally linear path in the plane of the U an amount which is a function of the applied load, an electrical translator, a pair of components in said translator which are moveable with respect to each other along an axis, said translator having an output which is a function of the relative movement of said components, cantilevers having adjustable lengths extending from each leg of said U, linkages from each cantilever to one of said components supporting said components with their axis of movement parallel with the direction of said linear path, each of said linkages having an adjustable effective length between its respective cantilever and component, and a section in one linkage parallel to said axis of movement having a thermal expansion characteristic along the axis which compensates the thermal expansion along the axis tending to move said components with respect to each other.

6. In a load measuring apparatus, a U-shaped spring, means applying a load across the legs of said U to alter the separation of said legs along a generally linear path in the plane of the U an amount which is a function of the applied load, an electrical translator, a pair of components in said translator which are moveable with respect to each other along an axis, said translator having an output which is a function of the relative movement of said components, cantilevers having adjustable lengths extending from each leg of said U, first and second linkages, one from each cantilever to one of said components supporting said components with their axis of movement parallel with the direction of said linear path, each of said linkages having an adjustable effective length between its respective cantilever and component, a first section in said first linkage having an adjustable effective length extending from said cantilever parallel to the axis of movement of said components, a second section in said first linkage having an adjustable effective length extending parallel to the axis of movement of said components, said first and second sections being of materials having different thermal coefficients of expansion, and a coupling between said first and second sections and adjustable in its position along the length of each section, said second portion having its effective length extend back upon the effective length of said first section.

References Cited in the file of this patent
UNITED STATES PATENTS

| | | |
|---|---|---|
| 2,112,252 | Sang | Mar. 29, 1938 |
| 2,242,011 | Malmberg | May 13, 1941 |
| 2,357,356 | Petty | Sept. 5, 1944 |
| 2,531,414 | Engwall | Nov. 28, 1950 |

FOREIGN PATENTS

| | | |
|---|---|---|
| 720,592 | Great Britain | Dec. 22, 1954 |